F. IZZO.
NUT LOCK.
APPLICATION FILED MAY 6, 1918. RENEWED FEB. 17, 1919.
1,307,861.
Patented June 24, 1919.
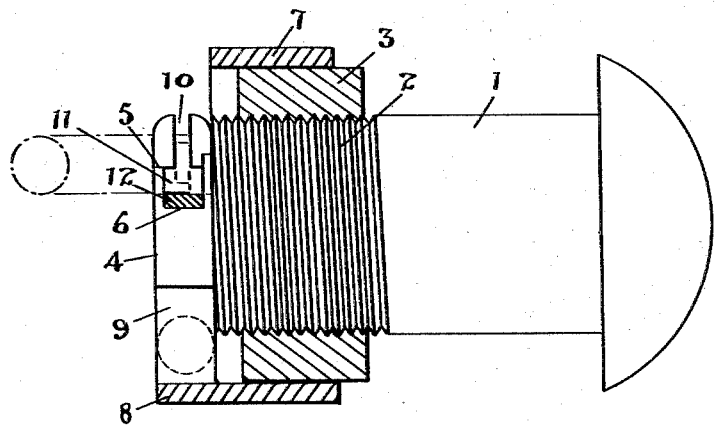
Fig. 1.
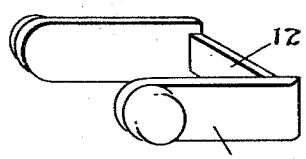
Fig. 4.
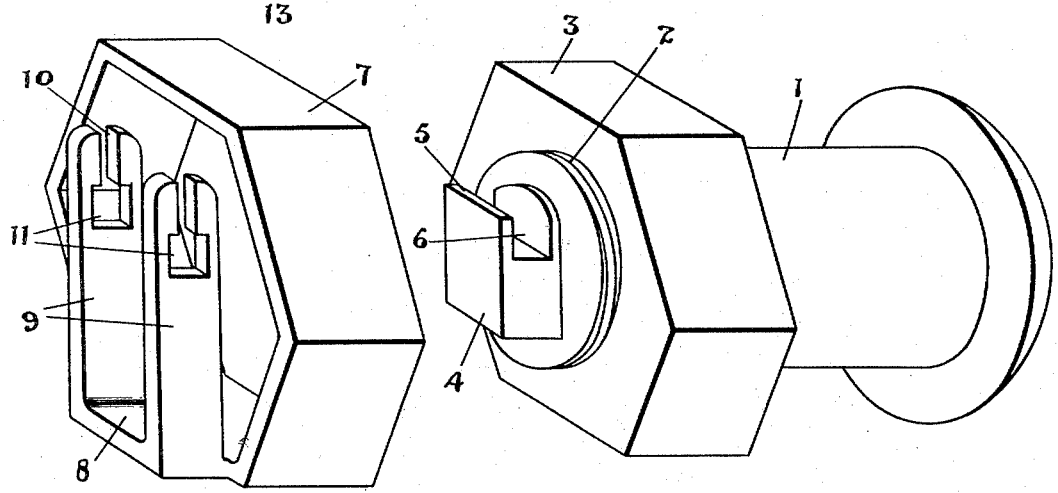
Fig. 3.
Fig. 2.
Inventor.
Francesco Izzo.
by H. J. S. Dennison
Atty.

UNITED STATES PATENT OFFICE.

FRANCESCO IZZO, OF TORONTO, ONTARIO, CANADA.

NUT-LOCK.

1,307,861.  Specification of Letters Patent.  Patented June 24, 1919.

Application filed May 6, 1918 Serial No. 232,813.  Renewed February 17, 1919.  Serial No. 277,646.

*To all whom it may concern:*

Be it known that I, FRANCESCO IZZO, a subject of the King of Great Britain, and resident of the city of Toronto, county of York, Province of Ontario, in the Dominion of Canada, have invented certain new and useful Improvements in Nut-Locks, described in the following specification and illustrated in the accompanying drawings, that form part of the same.

The principal object of this invention is to improve upon the means for securing a type of nut lock disclosed in my pending patent application No. 189,475 simplifying the final securing of the lock and enabling the lock to be more readily disengaged to allow of the adjustment of the nut.

A further object is to provide a final locking means which cannot become accidentally disengaged.

The principal feature of the invention consists in the novel construction of the member for preventing the turning of the nut upon the bolt and of the means for securing said member in place whereby the jaw-shaped member which non-rotatively engages the end of the bolt is slotted from the top to receive a flattened fastening member and whereby said flattened fastening member is adapted to be turned within the slots and locked securely against accidental movement.

In the accompanying drawings Figure 1 is an elevational view of a bolt showing the nut and my improved nut lock in section thereon, the fastening member of the nut lock being shown in section in a locked position and in the releasing position in dotted lines.

Fig. 2 is a perspective view of the bolt and nut with the nut lock removed.

Fig. 3 is a perspective view of the nut lock in position to be assembled on Fig. 2.

Fig. 4 is a perspective detail of the fastening member shown in the position to be dropped into the receiving slots in the locking member.

In my previous application for patent I have shown a socket member which fits over the nut and is provided with a jaw shaped projection which engages the flattened sides of a reduced portion of the bolt, the socket member being held in place on the bolt by a key being inserted transversely through slots in the ends of the jaw members.

According to the present improvement the bolt 1, which may be of any desirable form or it may be the end of a rod, is provided with a threaded end 2 upon which is threaded the nut 3. The outer end of the bolt is formed with a projection 4 provided with flattened sides and the side 5 is formed with a transverse slot 6.

The nut lock is formed of a socket member 7 adapted to fit over and encircle the periphery of the nut and is provided with a projecting portion 8 at one side from which the parallelly arranged members 9 extend upwardly to engage the flattened sides of the extension 4 of the bolt. The upper ends of the members 9 are formed with slots 10 leading to the rectangular shaped orifices 11. These rectangular shaped orifices are adapted to register with the ends of the transverse slot 6 in the bolt and are of corresponding width.

When the locking member 7 is inserted over the nut and the members 9 engage the flattened sides of the extension 4 of the bolt, the orifices 11 register with the ends of the slot 6 and the slots 10 open upwardly therefrom.

The fastening member consists of a bar 12 which is adapted when turned edgewise to slip through the slots 10 and the width of the bar 12 is slightly less than the width of the orifices 11 and of the slot 6 in the bolt.

The bar 12 is formed with the right angularly arranged end members 13. These are spaced apart corresponding to the extreme width of the member 8 and outside sides of the members 9. The members 13 are sprung slightly inward toward each other at their free ends so as to engage the outer sides of the members 9 in friction contact.

When the bar 12 is placed in position so as to fit transversely into the slot 6 of the bolt and the orifices 11 of the lock, the side members 13 extend downwardly parallel with the members 9 and engage the outer sides thereof.

It will be readily apparent that the bar 12 cannot accidentally become disengaged from the bolt but when it is desired to remove the nut lock the arms 13 may be sprung out from engagement with the side members 9 and turned to a right angular position as shown by dotted lines in Fig. 1, when the bar 12 may be slipped upwardly through the slots 10 and the lock then slipped off the nut and the nut adjusted. When the adjustment has been effected the locking member is slipped back over the nut and the fastener dropped into position as previously described.

A nut lock constructed as described is of very simple formation, costs very little to construct and will retain the nut and bolt in a positive relationship for an indefinite period. The lock may, however, be quickly removed and replaced at any time in the manner described.

What I claim as my invention is:—

1. In a nut lock, the combination with a bolt having flattened sides and a transverse slot between said sides, of a member non-rotatably engaging the perimeter of the nut and having extension members engaging the flattened sides of said bolt and formed with slotted orifices registering with said slot in the bolt, and a fastening member adapted to enter said slotted orifices and to be turned to a locking position.

2. In a nut lock, the combination with a bolt having flattened sides and a transverse slot between said sides, of a member non-rotatably engaging the perimeter of the nut and having extension members engaging the flattened sides of said bolt and formed with orifices registering with the ends of said slot, and having narrowed slots extending from the tops of said orifices through the ends of said members, and a fastening member formed of a thin flat bar adapted to pass edgewise through said slots and to be turned within said orifices, and means connected to the ends of said bar for holding it in its locked position.

3. In a nut lock, the combination with a bolt having flattened sides and a transverse slot between said sides, of a member non-rotatably engaging the perimeter of the nut and having extension members engaging the flattened sides of said bolt and formed with orifices registering with the ends of said slot, and having narrowed slots extending from the tops of said orifices through the ends of said members, and a fastening member formed of a thin flat bar adapted to pass edgewise through said slots and to be turned within said orifices, and arms extending at right angles to said bar and connected with the ends thereof and adapted to engage the outer sides of the members engaging the flattened sides of the bolt.

4. In a nut lock, the combination with a bolt having flattened sides and a transverse slot between said sides, of a member non-rotatably engaging the perimeter of the nut and having extension members engaging the flattened sides of said bolt and formed with orifices registering with the ends of said slot, and having narrowed slots extending from the tops of said orifices through the ends of said members, and a fastening member formed of a thin flat bar adapted to pass edgewise through said slots and to be turned within said orifices, said fastening member having the ends turned at substantially right angles thereto and forming spring arms adapted to engage the sides of the members engaging the flattened sides of the bolt.

FRANCESCO IZZO.